(12) United States Patent
Tomita

(10) Patent No.: US 8,482,604 B2
(45) Date of Patent: Jul. 9, 2013

(54) IMAGE DISPLAY APPARATUS AND IMAGE DISPLAY METHOD

(75) Inventor: Hideo Tomita, Kanagawa (JP)

(73) Assignee: Sony Corporation, Tokyo (JP)

(*) Notice: Subject to any disclaimer, the term of this patent is extended or adjusted under 35 U.S.C. 154(b) by 641 days.

(21) Appl. No.: 12/619,754

(22) Filed: Nov. 17, 2009

(65) Prior Publication Data

US 2010/0123774 A1 May 20, 2010

(30) Foreign Application Priority Data

Nov. 18, 2008 (JP) ................................ P2008-294232

(51) Int. Cl.
*H04N 13/04* (2006.01)
*H04N 9/47* (2006.01)

(52) U.S. Cl.
USPC ............................................ 348/54; 359/462

(58) Field of Classification Search
USPC ......................................................... 348/54
See application file for complete search history.

(56) References Cited

U.S. PATENT DOCUMENTS 6,476,820 B1 * 11/2002 Harada et al. ................. 345/589
2006/0087734 A1 * 4/2006 Weissman ..................... 359/462
2008/0303962 A1 * 12/2008 Tomita et al. ..................... 349/8

FOREIGN PATENT DOCUMENTS

| JP | 8-331600 | 12/1996 |
| JP | 2005 65055 | 3/2005 |
| JP | 2007 271828 | 10/2007 |

* cited by examiner

*Primary Examiner* — Anner Holder
(74) *Attorney, Agent, or Firm* — Frommer Lawrence & Haug LLP; William S. Frommer; Paul A. Levy

(57) ABSTRACT

An image display apparatus includes an image forming unit, a projecting unit, first and second correcting units, and a driving unit. The image forming unit forms images for left and right eyes. The projecting unit emits light for the left-eye image via an optical filter for the left eye and emits light for the right-eye image via an optical filter for the right eye having properties different from those of the left-eye optical filter, to display the images in a superimposed manner. The first and second correcting units each correct image signals for the corresponding eye using correction data for use in correcting non-uniformity in the image being displayed by the light emitted via the corresponding optical filter. The driving unit drives the image forming unit on the basis of the corrected image signals to cause the image forming unit to form the left-eye image and the right-eye image.

5 Claims, 9 Drawing Sheets

2D DISPLAY IMAGE

3D DISPLAY IMAGE
(FOR LEFT EYE)

3D DISPLAY IMAGE
(FOR RIGHT EYE)

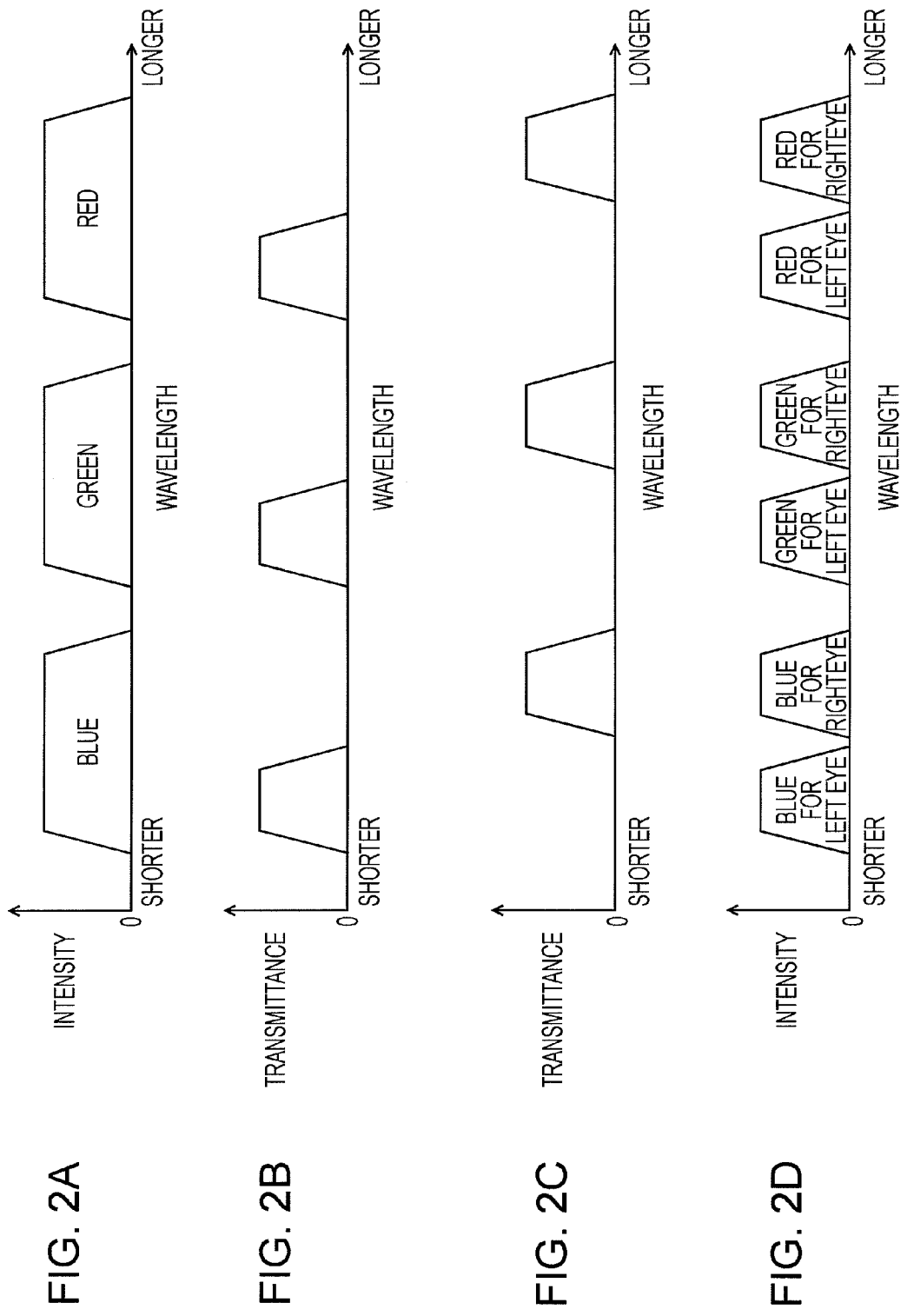

IMAGE DISPLAY APPARATUS AND IMAGE DISPLAY METHOD

BACKGROUND OF THE INVENTION

1. Field of the Invention

The present invention relates to an image display apparatus and an image display method. More specifically, the present invention relates to an image display apparatus and an image display method of emitting light for an image for a left eye and light for an image for a right eye so as to display a stereoscopic image.

2. Description of the Related Art

It has been proposed to use a single image display apparatus to project an image for a left eye and an image for a right eye onto a screen to display a stereoscopic image. For example, according to the technique disclosed in Japanese Unexamined Patent Application No. 2007-271828, an image for a left eye is displayed in an area that is approximately half the area of a display area of a display device and an image for a right eye is displayed in the other half area of the display area, and light from the displayed left-eye image and light from the displayed right-eye image are separated by a splitting mirror. The split lights are then passed through optical filters having different optical characteristics and projected onto a screen so as to be superimposed on each other, whereby a stereoscopic image is displayed.

Further, according to the technique disclosed in Japanese Unexamined Patent Application No. 2005-65055, in the case where image signals for two-dimensional image content are received, the image content is displayed as a plane image. In the case where image signals for three-dimensional image content are received, an optical filter is used to switch the polarizing orientation of light between a right-eye image and a left-eye image, for example, so as to display the image content as a stereoscopic image.

SUMMARY OF THE INVENTION

In the case where an optical filter is used for displaying a stereoscopic image, characteristics of the image displayed may be changed due to the use of the optical filter.

FIGS. 1A, 1B, and 1C show by way of example changes in characteristics of plane and stereoscopic images displayed. In an image display apparatus, in the case of displaying a plane image on the basis of image signals for image content of the plane image, "unevenness correction" is carried out to prevent occurrence of non-uniformity in display characteristics, such as unevenness in color or unevenness in luminance, as shown in FIG. 1A.

In the case of displaying a stereoscopic image using a wavelength division system, the light being emitted has its wavelengths restricted by the optical filter. FIGS. 2A, 2B, 2C, and 2D illustrate functions of wavelength division filters for left and right eyes. FIG. 2A shows a model of intensities of the lights which enter the left-eye wavelength division filter and the right-eye wavelength division filter. FIGS. 2B and 2C illustrate filter properties of the left-eye wavelength division filter and the right-eye wavelength division filter, respectively.

The light processed by the left-eye wavelength division filter results in lights of the respective color components for the left eye, as shown in FIG. 2D. The light processed by the right-eye wavelength division filter results in lights of the respective color components for the right eye, as shown in FIG. 2D.

The unevenness correction conducted in the case where a plane image is to be displayed is for preventing occurrence of unevenness in the image that will be displayed when the lights of the respective color components as shown in FIG. 2A are emitted. Thus, if the wavelengths of the lights which are passed through the wavelength division filters are restricted as shown in FIG. 2D, unevenness in the images displayed may become noticeable, as shown in FIG. 1B.

In view of the foregoing, it is desired to provide an image display apparatus and an image display method which can achieve a display image in which unevenness is unnoticeable even in the case where a stereoscopic image is to be displayed.

According to a first embodiment of the present invention, there is provided an image display apparatus which includes: an image forming unit configured to form an image for a left eye and an image for a right eye; a projecting unit configured to emit light for the left-eye image via an optical filter for the left eye and emit light for the right-eye image via an optical filter for the right eye to display the images so as to be superimposed on each other, the left-eye optical filter and the right-eye optical filter having properties different from each other; a first correcting unit configured to correct image signals for the left eye using first correction data for use in correcting non-uniformity in the image being displayed by the light emitted via the left-eye optical filter; a second correcting unit configured to correct image signals for the right eye using second correction data for use in correcting non-uniformity in the image being displayed by the light emitted via the right-eye optical filter; and a driving unit configured to drive the image forming unit on the basis of the corrected left-eye image signals and the corrected right-eye image signals to cause the image forming unit to form the left-eye image and the right-eye image.

In this embodiment of the present invention, the first correction data for use in correcting non-uniformity, e.g. unevenness in color or unevenness in luminance, in the image being displayed by the light emitted through the left-eye optical filter is stored in the first correction data storing unit. Further, the second correction data for use in correcting non-uniformity in the image being displayed by the light emitted through the right-eye optical filter is stored in the second correction data storing unit. In the first correcting unit, the first correction data stored in the first correction data storing unit is used to carry out correction of the left-eye image signals. In the second correcting unit, the second correction data stored in the second correction data storing unit is used to carry out correction of the right-eye image signals. The image forming unit is driven in accordance with the corrected left-eye image signals and the corrected right-eye image signals, so that the left-eye image and the right-eye image are formed by the image forming unit. Light for the left-eye image formed is emitted via the left-eye optical filter, and light for the right-eye image formed is emitted via the right-eye optical filter, and the left-eye image and the right-eye image are displayed superimposed on each other. As a result, in the left-eye image and the right-eye image displayed on a screen or the like, non-uniformity such as unevenness in color has been corrected, and accordingly, it is possible to obtain a favorable image suffering less unevenness.

According to a second embodiment of the present invention, there is provided an image display method which includes the steps of: forming an image for a left eye and an image for a right eye by using an image forming unit; emitting light for the left-eye image via an optical filter for the left eye and emitting light for the right-eye image via an optical filter for the right eye by using a projecting unit in order to display the images so as to be superimposed on each other, the left-eye optical filter and the right-eye optical filter having properties different from each other; correcting image signals for the left eye by using a first correcting unit using first correction data for use in correcting non-uniformity in the image being displayed by the light emitted via the left-eye optical filter; correcting image signals for the right eye by using a second correcting unit using second correction data for use in correcting non-uniformity in the image being displayed by the light emitted via the right-eye optical filter; and driving, by using a driving unit, the image forming unit on the basis of the corrected left-eye image signals and the corrected right-eye image signals to cause the image forming unit to form the left-eye image and the right-eye image.

BRIEF DESCRIPTION OF THE DRAWINGS

FIGS. 2A, 2B, 2C, and 2D illustrate the functions of a wavelength division filter for a left eye and a wavelength division filter for a right eye;

DESCRIPTION OF THE PREFERRED EMBODIMENTS

A best mode for carrying out the present invention (hereinafter, referred to as an "embodiment") will now be described in the following order:
1. Configuration of an optical system in the image display apparatus;
2. Configuration of an electrical system in the image display apparatus;
3. Operations of the image display apparatus; and
4. Method of setting correction data.

<1. Configuration of Optical System in Image Display Apparatus>

Figure 1A:
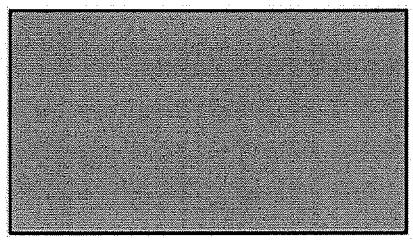
FIGS. 1A and 1B illustrate changes in characteristics of displayed images when plane and stereoscopic images are displayed.
Figure 1B:
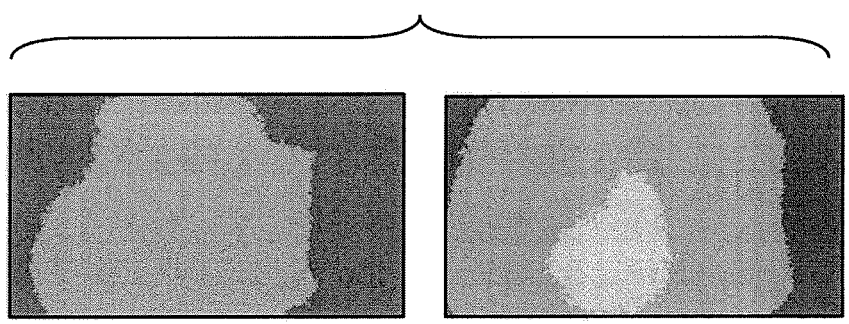
Figure 3:
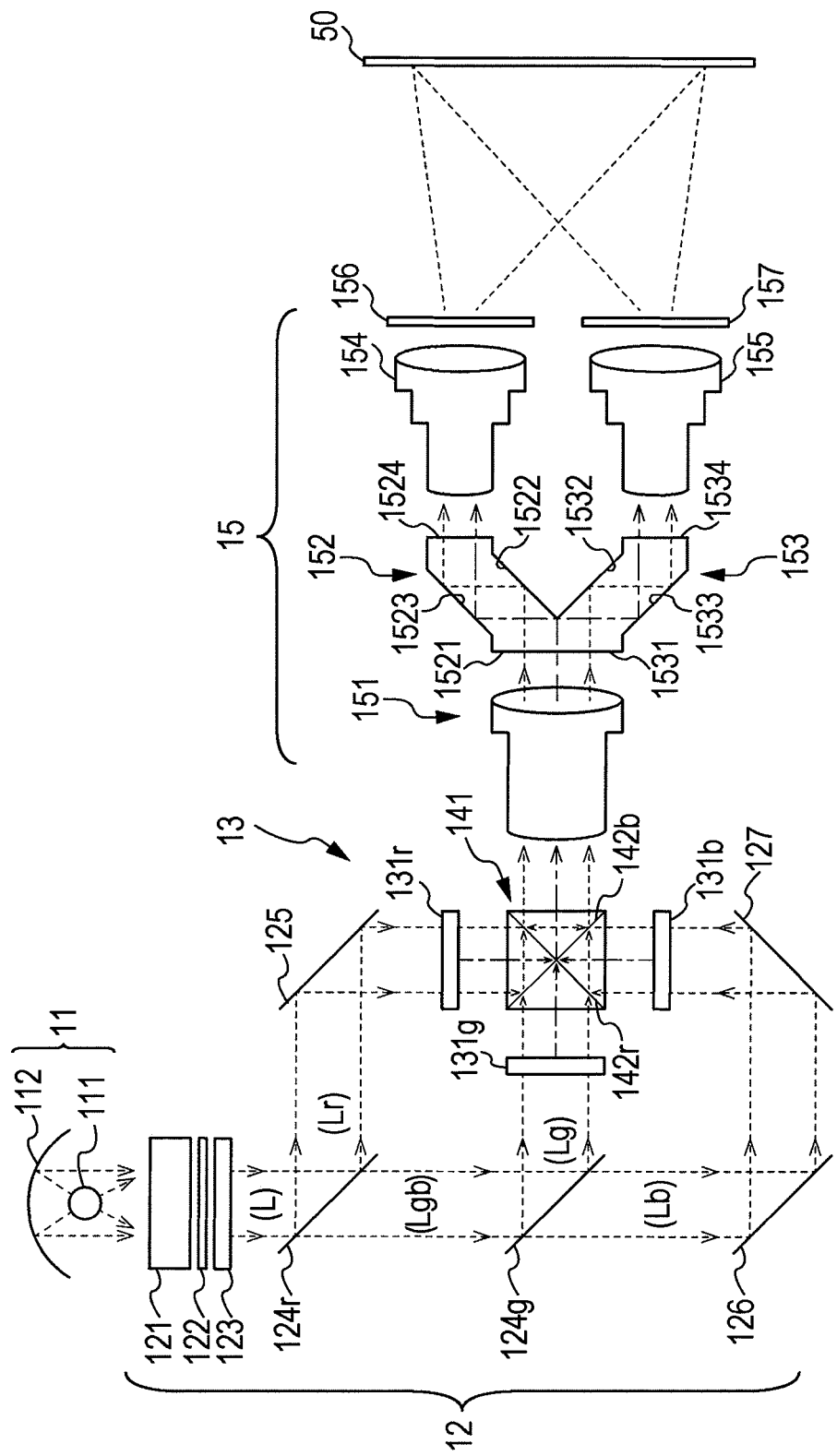
FIG. 3 illustrates the configuration of an optical system in an image display apparatus.

FIG. 3 illustrates the configuration of an optical system in an image display apparatus 10. The optical system of the image display apparatus 10 includes a light source unit 11, an illumination optical unit 12, an image forming unit 13, an image synthesizing unit 14, and a projecting unit 15. The image display apparatus shown in FIG. 3 is of a wavelength division system which uses wavelength division filters to display a stereoscopic image. Alternatively, the image display apparatus 10 may be of a system other than the wavelength division system, for example a polarization display system using polarizing filters.

The light source unit 11 is made up of a light source 111 and a reflecting condenser mirror 112. For the light source 111, a lamp emitting white light may be used, which may be for example an electric discharge lamp such as an ultra-high pressure mercury lamp, a metal halide lamp, or a xenon lamp. The reflecting condenser mirror 112 condenses the light emitted from the light source 111, and emits the condensed light to the illumination optical unit 12.

The illumination optical unit 12 is made up primarily of a collimator lens 121, an optical filter 122, a micro lens array (MLA) 123, dichroic mirrors 124r and 124g, and reflecting mirrors 125, 126, and 127.

The collimator lens 121 receives illumination light emitted from the light source unit 11, and emits the light in the form of parallel pencils of rays to the optical filter 122. The optical filter 122 eliminates light of an unnecessary wavelength range included in the illumination light. For example, the optical filter 122 eliminates light in the infrared range and/or light in the ultraviolet range.

The micro lens array (MLA) 123 has a plurality of lenses arranged in an array. The MLA 123 receives the illumination light from which the light of the unnecessary wavelength range has been eliminated, and condenses the light into a plurality of pencils of light so as to uniformly emit the illumination light to liquid crystal panels 131r, 131g, and 131b, which will be described later.

The dichroic mirror 124r is arranged so as to be tilted by 45 degrees, for example, with respect to the optical axis of the illumination light L emitted from the MLA 123. The dichroic mirror 124r reflects only the red light Lr included in the illumination light L toward the reflecting mirror 125, and passes the light Lgb of the other wavelength ranges therethrough.

The reflecting mirror 125 is tilted by 45 degrees, for example, with respect to the optical axis of the red light Lr which has been reflected by the dichroic mirror 124r, and reflects the red light Lr toward the liquid crystal panel 131r.

The dichroic mirror 124g is arranged so as to be tilted by 45 degrees, for example, with respect to the optical axis of the light Lgb which has been passed through the dichroic mirror 124r. Of the light Lgb passed through the dichroic mirror 124r, the dichroic mirror 124g reflects only the green light Lg toward the liquid crystal panel 131g, and passes the light of the other wavelength range, i.e. the blue light Lb, therethrough.

The reflecting mirror 126 is tilted by 45 degrees, for example, with respect to the optical axis of the blue light Lb which has been passed through the dichroic mirror 124g, and reflects the blue light Lb toward the reflecting mirror 127.

The reflecting mirror 127 is tilted by 45 degrees, for example, with respect to the optical axis of the blue light Lb which has been reflected by the reflecting mirror 126, and reflects the blue light Lb toward the liquid crystal panel 131b.

The image forming unit 13 is constituted by transparent type liquid crystal panels 131r, 131g, and 131b, which are identical in terms of shape of display area and also identical in terms of resolution. The image synthesizing unit 14 is constituted by a dichroic prism 141, for example. The liquid crystal panel 131r is arranged at a predetermined position to face a surface of the cubical dichroic prism 141. The liquid crystal panel 131g is arranged at a predetermined position to face another surface of the dichroic prism 141, and the liquid crystal panel 131b is arranged at a predetermined position to face yet another surface of the dichroic prism 141.

The liquid crystal panel 131r is driven in accordance with red-color drive signals DRr supplied from driving units 25L and 25R, which will be described later, to generate a red component image of the image to be displayed. As such, the red light Lr corresponding to the red component of the illumination light which is passed through the liquid crystal panel 131r is modulated in accordance with the red component image before being introduced into the image synthesizing unit 14.

The liquid crystal panel 131g is driven in accordance with green-color drive signals DRg supplied from the driving units 25L and 25R, to generate a green component image of the image to be displayed. As such, the green light Lg corresponding to the green component of the illumination light which is passed through the liquid crystal panel 131g is modulated in accordance with the green component image before being introduced into the image synthesizing unit 14.

The liquid crystal panel 131b is driven in accordance with blue-color drive signals DRb supplied from the driving units 25L and 25R, to generate a blue component image of the image to be displayed. As such, the blue light Lb corresponding to the blue component of the illumination light which is passed through the liquid crystal panel 131b is modulated in accordance with the blue component image before entering the image synthesizing unit 14.

The dichroic prism 141 is made up of a plurality of glass prisms joined together. On the faying surfaces of the glass prisms are formed interference filters 142b and 142r each having specific optical characteristics. The interference filter 142b reflects the blue light Lb and passes the red light Lr and the green light Lg therethrough. The interference filter 142r reflects the red light Lr and passes the green light Lg and the blue light Lb therethrough. Accordingly, the lights of the respective colors Lr, Lg, and Lb which have been modulated by the liquid crystal panels 131r, 131g, and 131b are synthesized before being introduced into the projecting unit 15.

Figure 4A:
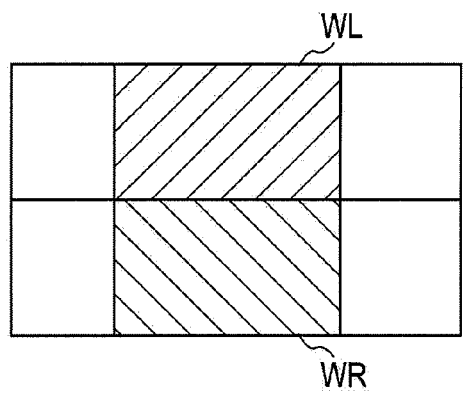
FIGS. 4A, 4B, 4C, and 4D illustrate images introduced into a projecting unit.
Figure 4B:
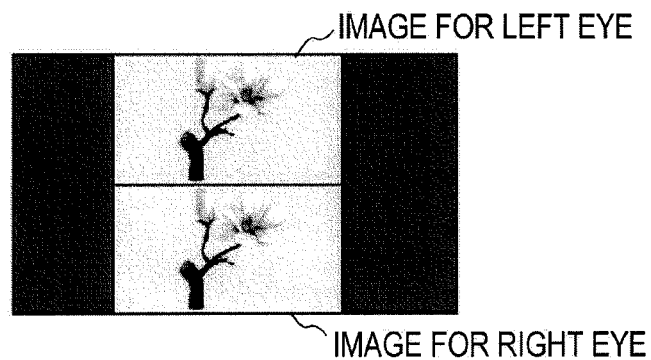

The liquid crystal panels 131r, 131g, and 131b each have a display area partitioned so as to generate left-eye and right-eye color component images of the corresponding color. As a result, lights representing the left-eye image and lights representing the right-eye image are incident on the projecting unit 15. FIGS. 4A, 4B, 4C, and 4D show by way of example the images received by the projecting unit 15. The display area of each of the liquid crystal panels 131r, 131g, and 131b may be partitioned in the vertical direction, as shown in FIG. 4A, to generate the left-eye and right-eye color component images of the corresponding color in a left-eye display area WL and a right-eye display area WR denoted by hatching. In this case, the images as shown in FIG. 4B are introduced into the projecting unit 15.

Figure 4C:
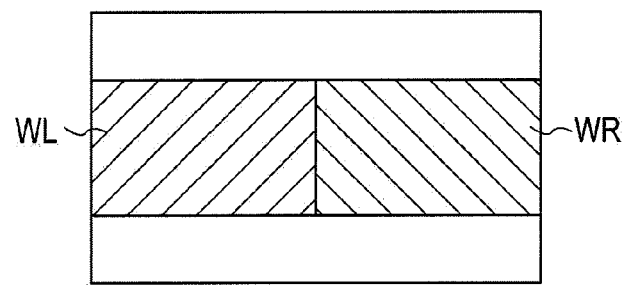
Figure 4D:
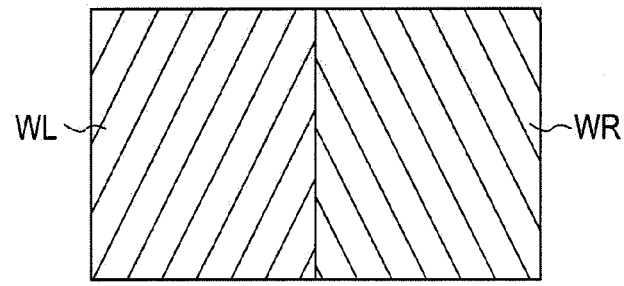

Alternatively, the display area of each of the liquid crystal panels 131r, 131g, and 131b may be partitioned in the horizontal direction, as shown in FIG. 4C, to generate the left-eye and right-eye color component images of the corresponding color in a left-eye display area WL and a right-eye display area WR denoted by hatching. Still alternatively, the display area of each of the liquid crystal panels 131r, 131g, and 131b may be partitioned in the horizontal direction, as shown in FIG. 4D, to generate the left-eye and right-eye color component images of the corresponding color over the entire display area.

The image forming unit 13 is not limited to the one using the transparent liquid crystal panels. It may use reflective liquid crystal panels, for example. Still alternatively, a digital micro mirror device (DMD) having a large number of small reflecting mirrors may be used to generate color component images of an image to be displayed, which are introduced into the projecting unit 15.

The projecting unit 15 is made up primarily of a relay lens 151, light guiding units 152 and 153, a projection lens 154 for a left eye, a projection lens 155 for a right eye, a wavelength division filter 156 for a left eye, a wavelength division filter 157 for a right eye, and a lens shifting mechanism 158.

The relay lens 151 is a lens system configured to transmit a real image. The relay lens 151 separates the image received from the image synthesizing unit 14 into a real image for the right eye and a real image for the left eye, and emits the resultant images to the light guiding units 152 and 153.

The light guiding units 152 and 153 separately guide the left-eye real image and the right-eye real image formed by the relay lens 151. The light guiding unit 152 has an incidence plane 1521, a first reflection plane 1522, a second reflection plane 1523, and an exit plane 1524. The left-eye real image is incident on the incidence plane 1521. On the first reflection plane 1522, the left-eye real image received from the incidence plane 1521 is reflected in a direction that is approximately 90 degrees with respect to the optical axis of the relay lens 151. On the second reflection plane 1523, the left-eye real image reflected by the first reflection plane 1522 is further reflected at an angle of approximately 90 degrees into the direction parallel to the optical axis of the relay lens 151. The left-eye real image reflected by the second reflection plane 1523 is emitted from the exit plane 1524 in the direction parallel to the optical axis of the relay lens 151.

The light guiding unit 153 has an incidence plane 1531, a first reflection plane 1532, a second reflection plane 1533, and an exit plane 1534. The right-eye real image is incident on the incidence plane 1531. On the first reflection plane 1532, the right-eye real image received from the incidence plane 1531 is reflected in a direction that is approximately 90 degrees with respect to the optical axis of the relay lens 151. On the second reflection plane 1533, the right-eye real image reflected by the first reflection plane 1532 is further reflected at an angle of approximately 90 degrees into the direction parallel to the optical axis of the relay lens 151. The right-eye real image reflected by the second reflection plane 1533 is emitted from the exit plane 1534 in the direction parallel to the optical axis of the relay lens 151.

The optical path constituted by the light guiding unit 152 and the optical path constituted by the light guiding unit 153 are arranged in the same plane, spaced apart from each other in a direction orthogonal to the optical axis of the relay lens 151. Accordingly, the exit plane 1524 of the light guiding unit 152 and the exit plane 1534 of the light guiding unit 153 are positioned at a predetermined distance from each other in a direction orthogonal to the optical axis of the relay lens 151.

The left-eye projection lens 154 is configured to project the left-eye real image, which has been guided by the light guiding unit 152, onto the screen 50 for forming an image for the left eye.

The right-eye projection lens 155 is configured to project the right-eye real image, which has been guided by the light guiding unit 153, onto the screen 50 for forming an image for the right eye.

The projecting unit 15 is further provided with the lens shifting mechanism 158. The lens shifting mechanism 158 is configured to adjust the distance between the left-eye projection lens 154 and the right-eye projection lens 155 in the direction orthogonal to the optical axes of the left-eye projection lens 154 and the right-eye projection lens 155 in the state where those optical axes are parallel to each other. Adjusting the distance between the left-eye projection lens 154 and the right-eye projection lens 155 by the lens shifting mechanism 158 allows the left-eye image and the right-eye image to be superimposed on each other when displayed on the screen 50, irrespective of the distances from the respective lenses to the screen 50.

The left-eye wavelength division filter 156 is arranged at the exit plane of the left-eye projection lens 154. The left-eye wavelength division filter 156 performs wavelength division on the left-eye image emitted from the left-eye projection lens 154, so as to pass a left-eye image that is constituted by components of predetermined wavelengths therethrough.

The right-eye wavelength division filter 157 is arranged at the exit plane of the right-eye projection lens 155. The right-eye wavelength division filter 157 performs wavelength division on the right-eye image emitted from the right-eye projection lens 155, so as to pass therethrough a right-eye image that is constituted by components of the wavelengths different from those passed through by the left-eye wavelength division filter 156. Alternatively, the left-eye wavelength division filter 156 may be arranged at the incidence plane of the left-eye projection lens 154 and the right-eye wavelength division filter 157 may be arranged at the incidence plane of the right-eye projection lens 155.

It is here assumed that the left-eye wavelength division filter 156 has filter properties as shown in FIG. 2B mentioned above and that the right-eye wavelength division filter 157 has filter properties as shown in FIG. 2C mentioned above.

The light which has been filtered by the left-eye wavelength division filter 156 results in lights of the respective color components for the left eye, as shown in FIG. 2D. The light which has been filtered by the right-eye wavelength division filter 157 results in lights of the respective color components for the right eye, as shown in FIG. 2D.

Accordingly, on the screen 50, the image for the left eye and the image for the right eye having different wavelengths are displayed in a superimposed manner. When stereoscopic glasses having a left-eye wavelength division filter provided for a left-eye lens and a right-eye wavelength division filter provided for a right-eye lens are used to see the images displayed on the screen 50, the images are recognized as a stereoscopic image.

<2. Configuration of Electrical System in Image Display Apparatus>

The configuration of an electrical system in the image display apparatus will now be described with reference to FIG. 5. The image display apparatus 10 primarily includes signal processing units 21L, 21R, correction data storing units 22L-2D, 22L-3D, 22R-2D, 22R-3D, a correction data selecting unit 23, correcting units 24L, 24R, driving units 25L, 25R, and a timing signal generating unit 29. Further, an image signal output device 60 and a control device 70 are connected to the image display apparatus 10.

The image signal output device 60 is configured to perform reproduction from a recording medium on which image content of a plane image (hereinafter, referred to as "2D content") is recorded, in order to supply image signals for the plane image to the image display apparatus 10. The image signal output device 60 is also configured to perform reproduction from a recording medium on which image content of a stereoscopic image (hereinafter, referred to as "3D content") is recorded, in order to supply image signals for the left eye and image signals for the right eye to the image display apparatus 10.

The control device 70 controls the image signal output device 60 to output image signals of desired 2D or 3D content. Further, the control device 70 provides the image display apparatus 10 with an identification signal indicating whether the image signals of the content being output from the image signal output device 60 are for 2D content or 3D content.

The signal processing unit 21L in the image display apparatus 10 performs frame rate conversion processing to convert a frame rate of the input image signals for the left eye to conform to the image forming unit 13, IP conversion processing to convert an interlace signal to a progressive signal, and other processing as appropriate. Further, the signal processing unit 21L performs resolution conversion processing to convert the resolution of the input image signals for the left eye to conform to the image forming unit 13, color conversion processing in accordance with the image forming unit 13, and other processing as appropriate, and supplies the processed left-eye image signals to the correcting unit 24L. The signal processing unit 21R in the image display apparatus 10 performs processing similar to that performed by the signal processing unit 21L as appropriate, and supplies the processed right-eye image signals to the correcting unit 24R.

The correction data selecting unit 23 is connected to the correcting units 24L and 24R. The correction data storing units 22L-2D, 22L-3D, 22R-2D, and 22R-3D are connected to the correction data selecting unit 23.

The correction data storing unit 22L-2D stores correction data for use in correcting non-uniformity in the image that will be displayed by the light emitted without being passed through the left-eye optical filter. In other words, the correction data storing unit 22L-2D stores the correction data which is used by the correcting unit 24L, when an image of 2D content is to be displayed, to perform correction of non-uniformity in the image, e.g. unevenness correction, on the image signals supplied from the signal processing unit 21L.

The correction data storing unit 22L-3D stores correction data for use in correcting non-uniformity in the image that will be displayed by the light emitted through the left-eye optical filter. In other words, the correction data storing unit 22L-3D stores the correction data which is used by the correcting unit 24L, when an image of 3D content is to be displayed, to perform correction of non-uniformity in the image, e.g. unevenness correction, on the image signals supplied from the signal processing unit 21L.

The correction data storing unit 22R-2D stores correction data for use in correcting non-uniformity in the image that will be displayed by the light emitted without being passed through the right-eye optical filter. In other words, the correction data storing unit 22R-2D stores the correction data which is used by the correcting unit 24R, when an image of 2D content is to be displayed, to perform correction of non-uniformity in the image, e.g. unevenness correction, on the image signals supplied from the signal processing unit 21R.

The correction data storing unit 22R-3D stores correction data for use in correcting non-uniformity in the image that will be displayed by the light emitted through the right-eye optical filter. In other words, the correction data storing unit 22R-3D stores the correction data which is used by the correcting unit 24R, when an image of 3D content is to be displayed, to perform correction of non-uniformity in the image, e.g. unevenness correction, on the image signals supplied from the signal processing unit 21R.

The correction data selecting unit 23 is configured to select the correction data to be used by the correcting units 24L and 24R, on the basis of the identification signal received from the control device 70. Specifically, when an image of 2D content is to be displayed, the correction data selecting unit 23 selects the correction data stored in the correction data storing unit 22L-2D so as to be used in the correcting unit 24L. The correction data selecting unit 23 also selects the correction data stored in the correction data storing unit 22R-2D so as to be used in the correcting unit 24R. When an image of 3D content is to be displayed, the correction data selecting unit 23 selects the correction data stored in the correction data storing unit 22L-3D so as to be used in the correcting unit 24L, and selects the correction data stored in the correction data storing unit 22R-3D so as to be used in the correcting unit 24R.

The correcting unit 24L uses the correction data stored in the correction data storing unit that has been selected by the correction data selecting unit 23, to correct non-uniformity of, e.g., color in the image being displayed on the basis of the image signals supplied from the signal processing unit 21L.

The correcting unit 24R uses the correction data stored in the correction data storing unit selected by the correction data selecting unit 23, to correct non-uniformity of, e.g., color in the image being displayed on the basis of the image signals supplied from the signal processing unit 21R.

Figure 6:
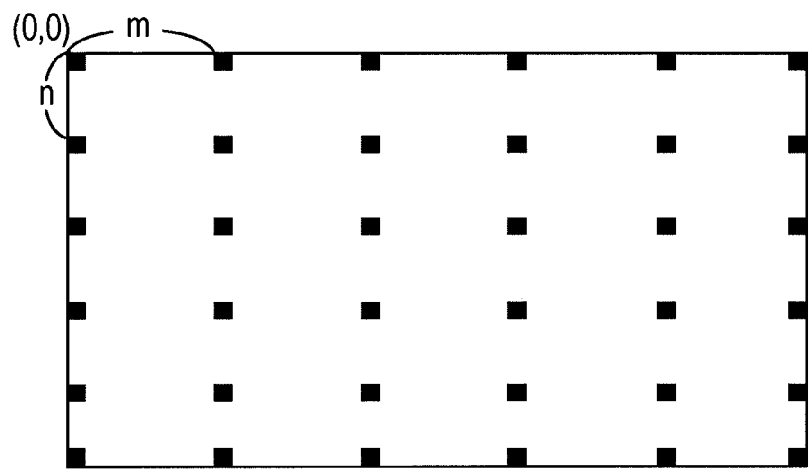
FIG. 6 illustrates correction data.

The correction data will now be described. The unevenness in the image displayed on the screen 50 is non-uniformity in the two-dimensional space in the horizontal and vertical directions, and thus, correction data corresponding to the two-dimensional space is necessary. In order to obtain the two-dimensional correction data, referring to FIG. 6, correction reference points are set along the edges in the horizontal direction (X direction) and the vertical direction (Y direction) of the display image (display screen), one for every m pixels in the horizontal direction and one for every n pixels in the vertical direction. The correction reference points are also set within the display image, one for every certain number of pixels (m×n). At each correction reference point, color is measured. The correction data is then set for each correction reference point, in accordance with the measurement result, so that a predetermined color can be obtained at the point. A set of the correction data obtained in this manner constitutes the two-dimensional correction data.

Figure 7:
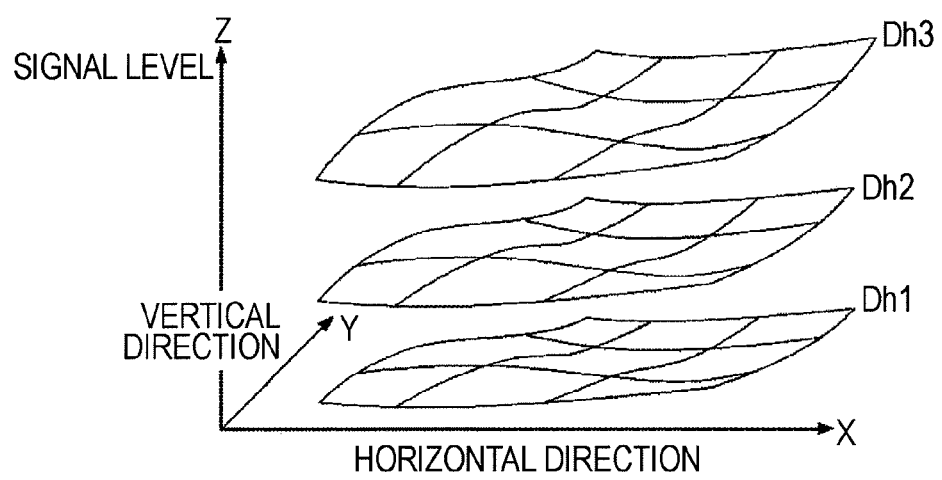
FIG. 7 schematically illustrates the configuration of the correction data.

In the case where the unevenness varies depending on the luminance of the display image, the two-dimensional correction data may be obtained for each of a plurality of luminance levels and stored in the correction data storing units 22L-2D, 22L-3D, 22R-2D, and 22R-3D. FIG. 7 schematically illustrates the configuration of the correction data. In the case where image signals of three primary colors, a red image signal DSr, a green image signal DSg, and a blue image signal DSb, are to be supplied from the signal processing unit 21L to the correcting unit 24L, the correction data as shown in FIG. 7 are obtained in advance for each image signal of the red image signal DSr, the green image signal DSg, and the blue image signal DSb. Furthermore, for each of the plurality of luminance levels, a set of the two-dimensional correction data is stored in advance for the signal level of the image signals corresponding to that luminance level. In FIG. 7, three sets of the correction data, Dh1, Dh2, and Dh3, are shown in the three-dimensional space where the X and Y directions correspond to the horizontal and vertical directions, respectively, of the display image (display screen), and the Z direction corresponds to the signal level direction.

Figure 8:
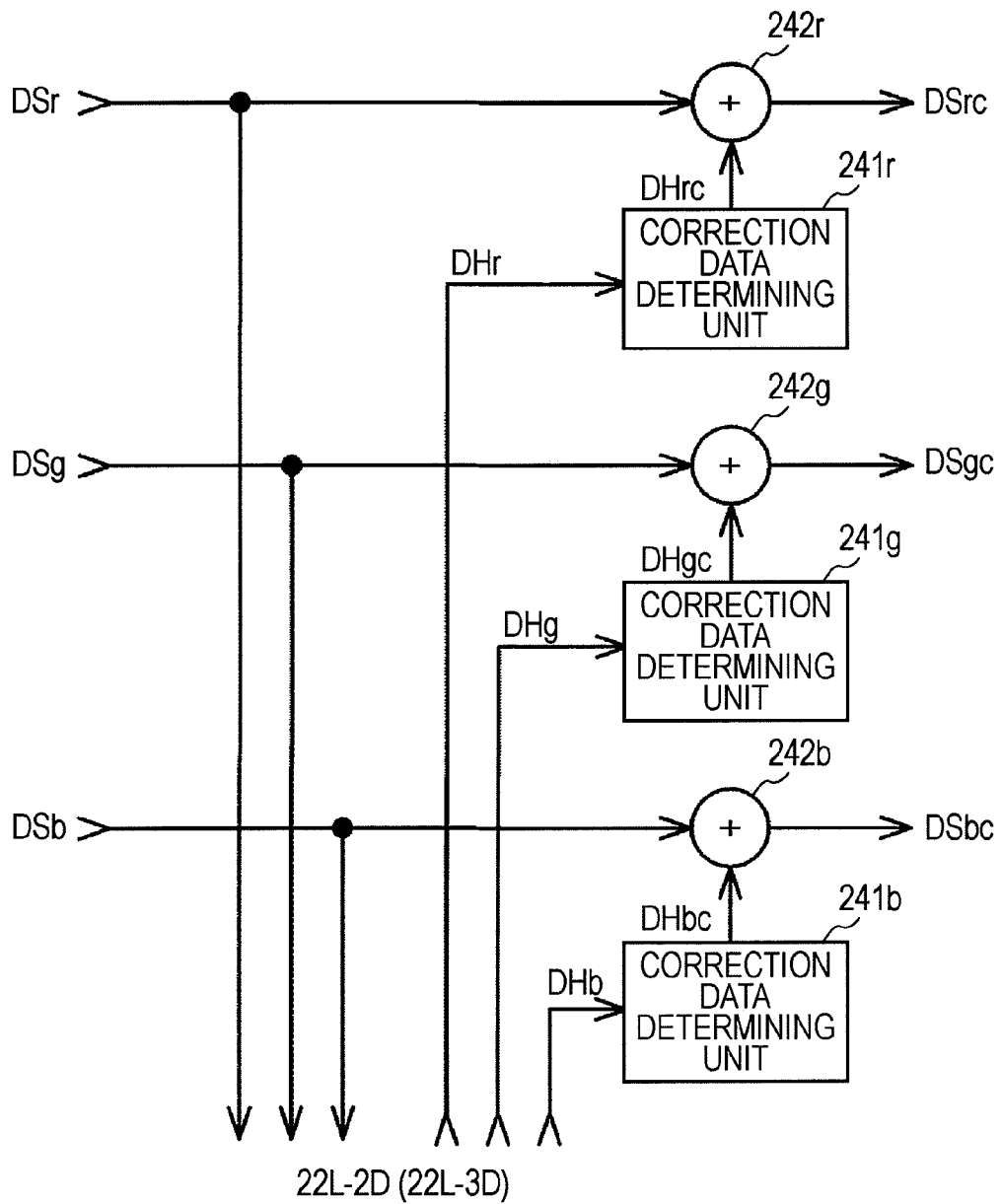
FIG. 8 illustrates the configuration of a correcting unit.

FIG. 8 shows by way of example the configuration of the correcting unit. In FIG. 8, it is assumed that a red image signal DSr, a green image signal DSg, and a blue image signal DSb are input into the correcting unit 24L.

The red image signal DSr is supplied to the correction data storing unit 22L-2D (22L-3D) and an adder 242r. The green image signal DSg is supplied to the correction data storing unit 22L-2D (22L-3D) and an adder 242g. The blue image signal DSb is supplied to the correction data storing unit 22L-2D (22L-3D) and an adder 242b.

The correction data storing unit 22L-2D (22L-3D) sets a position of the pixel to be corrected and a signal level for each color of the pixel to be corrected as a reference position in the three-dimensional space shown in FIG. 7, and supplies the correction data for the correction reference points located in the vicinity of that reference position to a corresponding one of correction data determining units 241r, 241g, and 241b.

Figure 9:
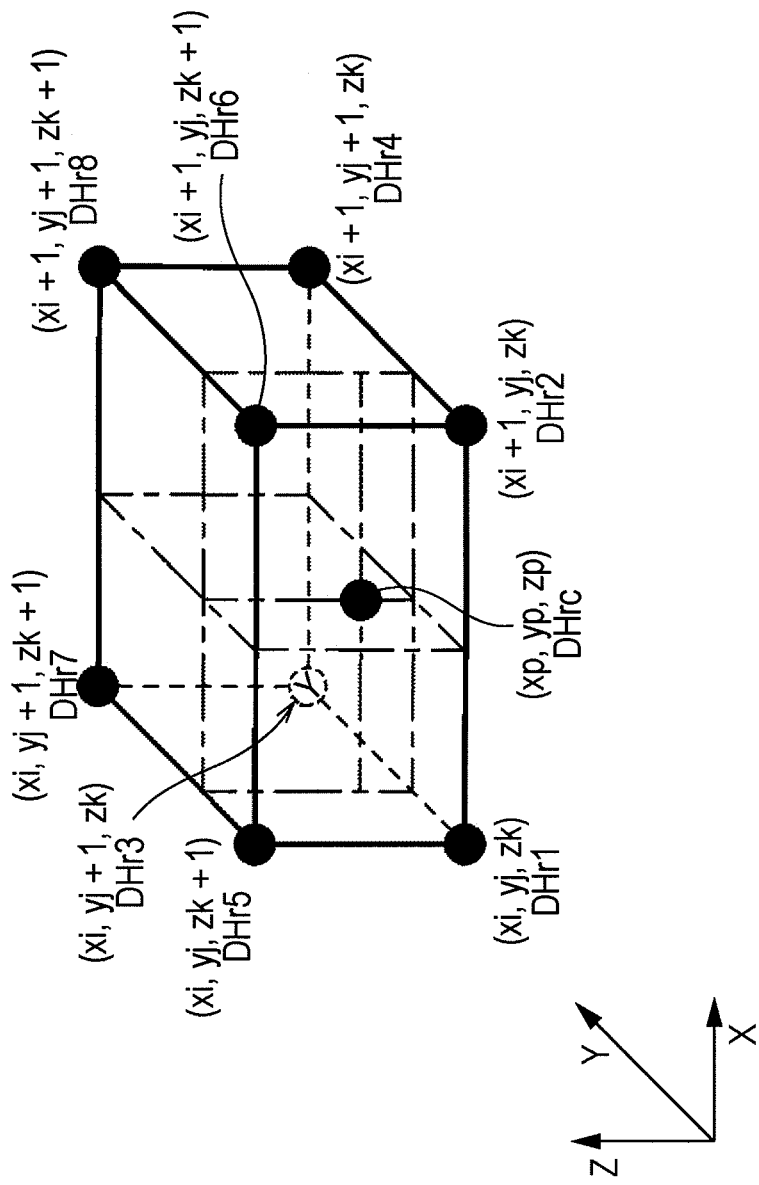
FIG. 9 illustrates an operation of a correction data determining unit.

FIG. 9 illustrates the correction data to be read from the correction data storing unit 22L-2D (22L-3D). It is here assumed that the pixel at the position of (xp, yp) is to be corrected and that the red image signal DSr, for example, is at the signal level of (zp). In this case, the correction reference points in the positions (xi) and (xi+1) are in the vicinity of the position (xp), the correction reference points in the positions (yj) and (yj+1) are in the vicinity of the position (yp), and the signal levels (zk) and (zk+1) are near the signal level (zp). That is, in the case where the position of the pixel to be corrected is (xp, yp) and the signal level is (zp), the correction data in eight positions (xi, yj, zk) to (xi+1, yj+1, zk+1) in FIG. 9 are selected as the correction data for the neighboring correction reference points.

Thus, the correction data storing unit 22L-2D (22L-3D) determines the position (xp, yp) of the pixel to be corrected in accordance with a timing signal supplied from the timing signal generating unit 29, which will be described later, and on the basis of the determination result as well as the signal level (zp) of the image signal supplied from the correcting unit, supplies the correction data DHr1 to DHr8 for the eight positions (xi, yj, zk) to (xi+1, yj+1, zk+1) to the correction data determining unit 241r. Similarly, the correction data storing unit 22L-2D (22L-3D) supplies correction data DHg1 to DHg8 for eight positions based on the green image signal DSg to the correction data determining unit 241g, and supplies correction data DHb1 to DHb8 for eight positions based on the blue image signal DSb to the correction data determining unit 241b.

The correction data determining unit 241r shown in FIG. 8 uses a plurality of correction data supplied from the correction data storing unit 22L-2D (22L-3D) to perform interpolation. Specifically, the correction data determining unit 241r performs linear interpolation using the correction data DHr1 to DHr8 for the eight positions, for example, to determine red correction data DHrc corresponding to the position of the pixel to be corrected and also corresponding to the signal level of the red image signal DSr of the pixel to be corrected, and supplies the red correction data DHrc to the adder 242r.

Similarly, the correction data determining unit 241g uses a plurality of correction data supplied from the correction data storing unit 22L-2D (22L-3D) to perform interpolation so as to determine green correction data DHgc corresponding to the position of the pixel to be corrected and also corresponding to the signal level of the green image signal DSg of the pixel to be corrected, and supplies the green correction data DHgc to the adder 242g. Furthermore, the correction data determining unit 241b uses a plurality of correction data supplied from the correction data storing unit 22L-2D (22L-3D) to perform interpolation so as to determine blue correction data DHbc corresponding to the position of the pixel to be corrected and also corresponding to the signal level of the blue image signal DSb of the pixel to be corrected, and supplies the blue correction data DHbc to the adder 242b.

The adder 242r adds the red correction data DHrc supplied from the correction data determining unit 241r to the red image signal DSr to generate a red image signal DSrc for which unevenness has been corrected, and outputs the red image signal DSrc to the driving unit 25L.

The adder 242g adds the green correction data DHgc supplied from the correction data determining unit 241g to the green image signal DSg to generate a green image signal DSgc for which unevenness has been corrected, and outputs the green image signal DSgc to the driving unit 25L.

The adder 242b adds the blue correction data DHbc supplied from the correction data determining unit 241b to the blue image signal DSb to generate a blue image signal DSbc for which unevenness has been corrected, and outputs the blue image signal DSbc to the driving unit 25L.

Figure 5:
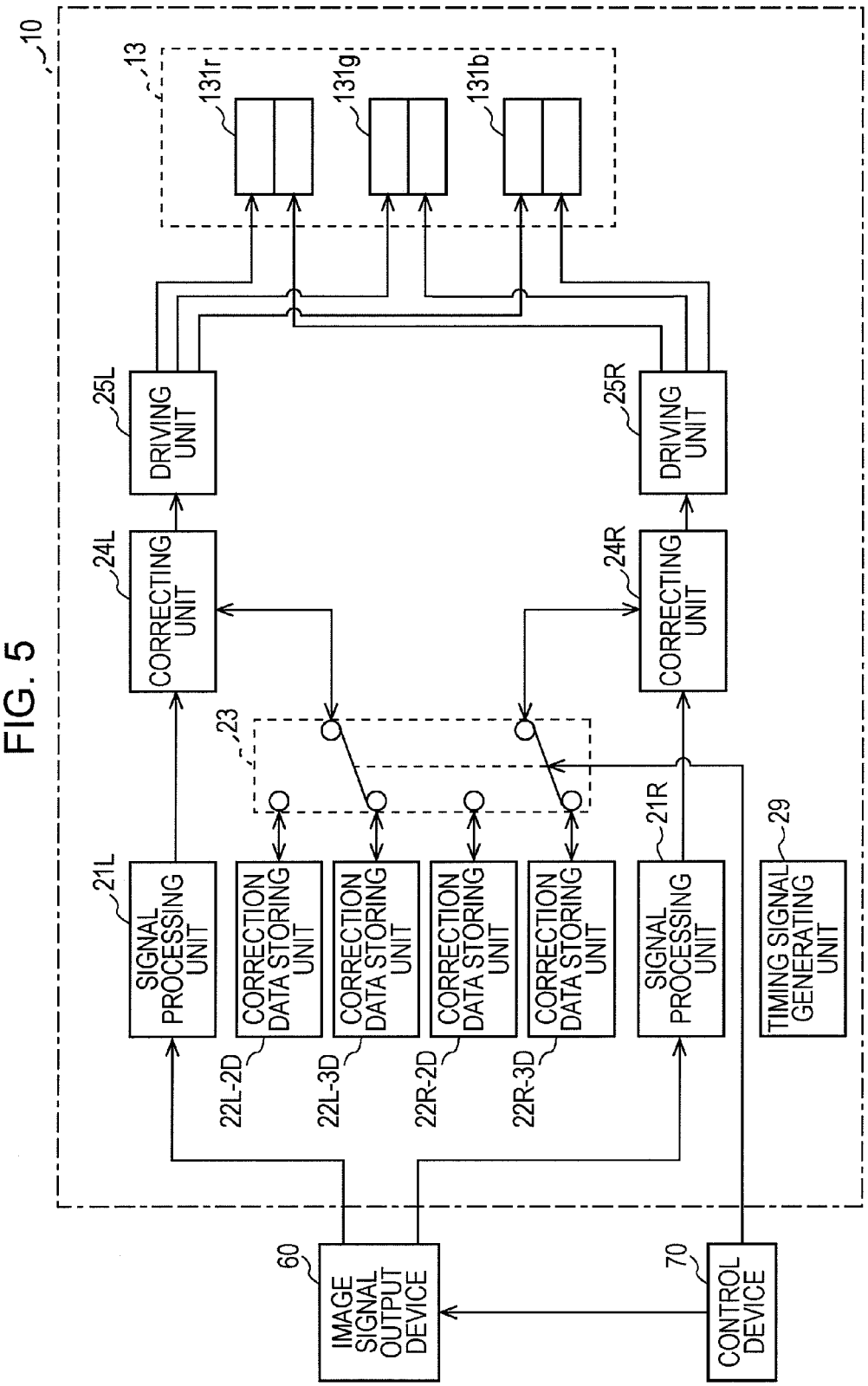
FIG. 5 is a block diagram illustrating the configuration of an electrical system in the image display apparatus.

The correcting unit 24R shown in FIG. 5 functions similarly to the correcting unit 24L. Specifically, the correcting unit 24R corrects the image signals of the three primary colors of red, green, and blue input from the signal processing unit 21R, by using the correction data for the respective colors read from the correction data storing unit 22R-2D (22R-3D). The correcting unit 24R then outputs the unevenness-corrected red, green, and blue image signals to the driving unit 25R.

It is noted that the correction data may be set in a manner different from the interpolation using eight pieces of correction data. For example, correction data may be stored for each pixel position, for each of a plurality of signal levels, and the correction data of two signal levels which have the same pixel position as the pixel to be corrected may be used to set the correction data by interpolation from the two signal levels in accordance with the signal level of the pixel to be corrected. Furthermore, the correction data may indicate not only the amount of correction, but also the ratio of correction and the like.

The driving unit 25L generates a drive signal for driving a display area for the left eye in the liquid crystal panel 131r, on the basis of the unevenness-corrected red image signal supplied from the correcting unit 24L, and outputs the generated drive signal to the liquid crystal panel 131r. Further, the driving unit 25L generates a drive signal for driving a display area for the left eye in the liquid crystal panel 131g, on the basis of the unevenness-corrected green image signal supplied from the correcting unit 24L, and outputs the generated drive signal to the liquid crystal panel 131g. Furthermore, the driving unit 25L generates a drive signal for driving a display area for the left eye in the liquid crystal panel 131b, on the basis of the unevenness-corrected blue image signal supplied from the correcting unit 24L, and outputs the generated drive signal to the liquid crystal panel 131b.

Similarly, the driving unit 25R generates a drive signal for driving a display area for the right eye in the liquid crystal panel 131r, on the basis of the unevenness-corrected red image signal supplied from the correcting unit 24R, and outputs the generated drive signal to the liquid crystal panel 131r. Further, the driving unit 25R generates a drive signal for driving a display area for the right eye in the liquid crystal panel 131g, on the basis of the unevenness-corrected green image signal supplied from the correcting unit 24R, and outputs the generated drive signal to the liquid crystal panel 131g. Furthermore, the driving unit 25R generates a drive signal for driving a display area for the right eye in the liquid crystal panel 131b, on the basis of the unevenness-corrected blue image signal supplied from the correcting unit 24R, and outputs the generated drive signal to the liquid crystal panel 131b.

The timing signal generating unit 29 generates various timing signals on the basis of, e.g., a synchronization signal supplied from the image signal output device 60 and on the basis of, e.g., a synchronization signal extracted from the image signal supplied to the image display apparatus 10. Further, the timing signal generating unit 29 supplies the generated timing signals to the correction data storing units 22L-2D, 22L-3D, 22R-2D, and 22R-3D, and the correcting units 24L and 24R, so as to cause those units to operate synchronously. Furthermore, the timing signal generating unit 29 controls such that the correction data corresponding to the pixel to be corrected are supplied from the correction data storing units 22L-2D, 22L-3D, 22R-2D, and 22R-3D to the correcting units 24L and 24R.

<3. Operations of Image Display Apparatus>

Operations of the image display apparatus will now be described. When an image of 2D content is to be displayed, the control device 70 controls the image signal output device 60 to output the image signals of the 2D content to the image display apparatus 10. Further, the control device 70 outputs to the image display apparatus 10 an identification signal indicating that the image signals being output from the image signal output device 60 are the image signals of the 2D content.

The signal processing unit 21L in the image display apparatus 10 performs the frame rate conversion processing, the IP conversion processing, the resolution conversion processing, the color conversion processing, and other processing as appropriate, and supplies the processed image signals to the correcting unit 24L. The signal processing unit 21R in the image display apparatus 10 performs similar processing to that performed by the signal processing unit 21L, and supplies the processed image signals to the correcting unit 24R.

In the case where the identification signal received from the control device 70 indicates that the image signals supplied are of the 2D content, the correction data selecting unit 23 selects the correction data storing units 22L-2D and 22R-2D. The correction data storing units 22L-2D and 22R-2D each pre-store the correction data which are set to prevent occurrence of unevenness in color when an image of 2D content is to be displayed.

The correcting unit 24L uses the correction data for each pixel which has been read from the correction data storing unit 22L-2D to perform unevenness correction, and outputs the unevenness-corrected image signals to the driving unit 25L. Similarly, the correcting unit 24R uses the correction data read from the correction data storing unit 22R-2D to perform unevenness correction, and outputs the unevenness-corrected image signals to the driving unit 25R.

The driving unit 25L generates a drive signal for driving the left-eye display area in the liquid crystal panel 131r, on the basis of the unevenness-corrected red image signal supplied from the correcting unit 24L, and outputs the generated drive signal to the liquid crystal panel 131r. Further, the driving unit 25L generates a drive signal for driving the left-eye display area in the liquid crystal panel 131g, on the basis of the unevenness-corrected green image signal supplied from the correcting unit 24L, and outputs the generated drive signal to the liquid crystal panel 131g. Furthermore, the driving unit 25L generates a drive signal for driving the left-eye display area in the liquid crystal panel 131b, on the basis of the unevenness-corrected blue image signal supplied from the correcting unit 24L, and outputs the generated drive signal to the liquid crystal panel 131b.

Similarly, the driving unit 25R generates a drive signal for driving the right-eye display area in the liquid crystal panel 131r, on the basis of the unevenness-corrected red image signal supplied from the correcting unit 24R, and outputs the generated drive signal to the liquid crystal panel 131r. Further, the driving unit 25R generates a drive signal for driving the right-eye display area in the liquid crystal panel 131g, on the basis of the unevenness-corrected green image signal supplied from the correcting unit 24R, and outputs the generated drive signal to the liquid crystal panel 131g. Furthermore, the driving unit 25R generates a drive signal for driving the right-eye display area in the liquid crystal panel 131b, on the basis of the unevenness-corrected blue image signal supplied from the correcting unit 24R, and outputs the generated drive signal to the liquid crystal panel 131b.

The image display apparatus 10 displays the image on the screen 50, without using the left-eye wavelength division filter 156 or the right-eye wavelength division filter 157.

As described above, in the case where an image of 2D content is to be displayed, the correction data for use in correcting non-uniformity in the image that will be displayed by the light emitted without being passed through the left-eye wavelength division filter 156 is used by the correcting unit 24L to perform unevenness correction. Further, the correction data for use in correcting non-uniformity in the image that will be displayed by the light emitted without being passed through the right-eye wavelength division filter 157 is used by the correcting unit 24R to perform unevenness correction. This ensures favorable correction of the non-uniformity in the image of the 2D content being displayed.

In the case where an image of 3D content is to be displayed, the control device 70 controls the image signal output device 60 to output image signals of 3D content to the image display apparatus 10. Further, the control device 70 outputs to the image display apparatus 10 an identification signal indicating that the image signals being output from the image signal output device 60 are for an image of the 3D content.

The signal processing unit 21L in the image display apparatus 10 performs processing including the frame rate conversion processing, the IP conversion processing, the resolution conversion processing, and the color conversion processing, as appropriate, on the image signals for the left eye supplied from the image signal output device 60, and supplies the processed left-eye image signals to the correcting unit 24L. The signal processing unit 21R, similarly to the signal processing unit 21L, performs various processing as appropriate on the image signals for the right eye supplied from the image signal output device 60, and supplies the processed right-eye image signals to the correcting unit 24R.

In the case where the identification signal received from the control device 70 indicates that the image signals are of the 3D content, the correction data selecting unit 23 selects the correction data storing units 22L-3D and 22R-3D. The correction data storing unit 22L-3D prestores the correction data which has been set to prevent occurrence of unevenness in color when a left-eye image of the 3D content is to be displayed. Further, the correction data storing unit 22R-3D prestores the correction data which has been set to prevent occurrence of unevenness in color when a right-eye image of the 3D content is to be displayed.

The correcting unit 24L uses the correction data for each pixel which has been read from the correction data storing unit 22L-3D to perform unevenness correction, and outputs the unevenness-corrected image signals to the driving unit 25L. Similarly, the correcting unit 24R uses the correction data read from the correction data storing unit 22R-3D to perform unevenness correction, and outputs the unevenness-corrected image signals to the driving unit 25R.

The driving unit 25L generates drive signals for driving the left-eye display areas in the liquid crystal panels 131r, 131g, and 131b, on the basis of the unevenness-corrected image signals supplied from the correcting unit 24L as described above, and outputs the generated drive signals to the corresponding liquid crystal panels 131r, 131g, and 131b.

The driving unit 25R generates drive signals for driving the right-eye display areas in the liquid crystal panels 131r, 131g, and 131b, on the basis of the unevenness-corrected image signals supplied from the correcting unit 24R as described above, and outputs the generated drive signals to the corresponding liquid crystal panels 131r, 131g, and 131b.

The image display apparatus 10 displays the images on the screen 50 via the left-eye wavelength division filter 156 and the right-eye wavelength division filter 157.

As described above, in the case where an image of 3D content is to be displayed, the correction data for use in correcting non-uniformity in the image that will be displayed by the light emitted via the left-eye wavelength division filter 156 is used by the correcting unit 24L to perform unevenness correction. Further, the correction data for use in correcting non-uniformity in the image that will be displayed by the light emitted via the right-eye wavelength division filter 157 is used by the correcting unit 24R to perform unevenness correction. This ensures that, even in the case where the content to be displayed is 3D content, non-uniformity in the image of the 3D content can be corrected favorably.

It is noted that the correction data storing units 22L-2D, 22L-3D, 22R-2D, and 22R-3D may store the correction data enabling correction of not only unevenness in color, but also unevenness in luminance.

<4. Method of Setting Correction Data>

A method of setting the correction data stored in the correction data storing units will now be described. The correction data may be set, e.g., during a manufacturing process of the image display apparatus, or in course of customer services.

Figure 10:
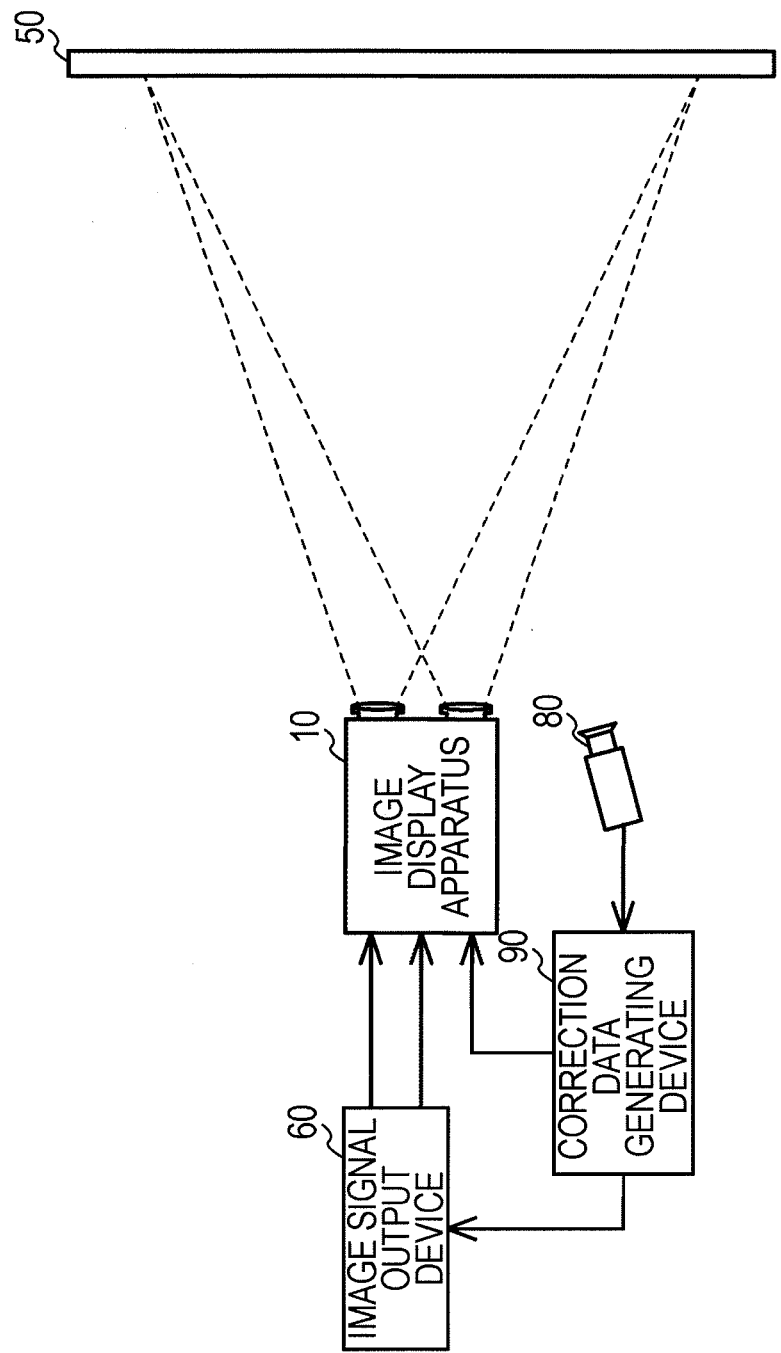
FIG. 10 illustrates a method of setting the correction data.

Referring to FIG. 10, the correction data are set using the image display apparatus 10, the screen 50, the image signal output device 60, an image pick-up device 80, and a correction data generating device 90. The image signal output device 60 outputs image signals for measurement to the image display apparatus 10. The image signals for measurement may be image signals for an image that is in achromatic color or monotone and uniform in luminance. The image pick-up device 80 picks up the image that is displayed on the screen 50 by the image display apparatus 10, to generate image signals. The image pick-up device 80 then supplies the generated image signals to the correction data generating device 90. The correction data generating device 90 is constituted primarily by a measuring device and a computing device, and measures the state of unevenness on the basis of the image signals input. The correction data generating device 90, on the basis of the measurement result, generates correction data which can cancel out the unevenness to obtain a uniform image, and stores the generated correction data in the correction data storing units 22L-2D, 22L-3D, 22R-2D, and 22R-3D.

For setting the correction data stored in the correction data storing units 22L-2D and 22R-2D which are used when an image of 2D content is to be displayed, the correction data generating device 90 firstly causes the image signal output device 60 to supply the image signals for measurement to the signal processing unit 21L in the image display apparatus 10. The image display apparatus 10 displays the image on the screen 50, without performing unevenness correction in the correcting unit 24L, and not using the left-eye wavelength division filter 156. The image pick-up device 80 picks up the image which has been displayed on the screen 50, to generate image signals. The image pick-up device 80 then supplies the generated image signals to the correction data generating device 90. The correction data generating device 90 measures the state of unevenness on the basis of the image signals generated by the image pick-up device 80 so as to generate correction data and compute the interpolation on the basis of the measurement results as described above, and accordingly, the correction data generating device 90 generates the correction data for each pixel position and stores the generated correction data in the correction data storing unit 22L-2D.

Next, the correction data generating device 90 controls the image signal output device 60 to supply the image signals for measurement to the signal processing unit 21R in the image display apparatus 10. The image display apparatus 10 displays the image on the screen 50, without performing unevenness correction in the correcting unit 24R, and not using the right-eye wavelength division filter 157. The image pick-up device 80 picks up the image which has been displayed on the screen 50, to generate image signals. The image pick-up device 80 then supplies the generated image signals to the correction data generating device 90. The correction data generating device 90 measures the state of unevenness on the basis of the image signals generated by the image pick-up device 80. Then, on the basis of the measurement results and the interpolation computation, the correction data generating device 90 generates the correction data for each pixel position and stores the generated correction data in the correction data storing unit 22R-2D. In this manner, the correction data optimally used when an image of 2D content is to be displayed can be stored in the correction data storing units 22L-2D and 22R-2D.

For setting the correction data stored in the correction data storing units 22L-3D and 22R-3D which are used when an image of 3D content is to be displayed, the correction data generating device 90 firstly causes the image signal output device 60 to supply the image signals for measurement to the signal processing unit 21L in the image display apparatus 10. The image display apparatus 10 displays the image on the screen 50, without performing unevenness correction in the correcting unit 24L, but using the left-eye wavelength division filter 156. In picking up the image which has been displayed on the screen 50, the image pick-up device 80 does so via a wavelength division filter having properties identical to those of the left-eye wavelength division filter 156, to generate image signals. The image pick-up device 80 supplies the generated image signals to the correction data generating device 90. The correction data generating device 90 measures the state of unevenness on the basis of the image signals generated by the image pick-up device 80 and, on the basis of the measurement results and the interpolation computation, generates the correction data for each pixel position and stores the generated correction data in the correction data storing unit 22L-3D.

Next, the correction data generating device 90 controls the image signal output device 60 to supply the image signals for measurement to the signal processing unit 21R in the image display apparatus 10. The image display apparatus 10 displays the image on the screen 50, without performing unevenness correction in the correcting unit 24R, but using the right-eye wavelength division filter 157. The image pick-up device 80 picks up the image which has been displayed on the screen 50, via a wavelength division filter having properties identical to those of the right-eye wavelength division filter 157, to generate image signals. The image pick-up device 80 supplies the generated image signals to the correction data generating device 90. The correction data generating device 90 measures the state of unevenness on the basis of the image signals generated by the image pick-up device 80 and, on the basis of the measurement results and the interpolation computation, generates the correction data for each pixel position and stores the generated correction data in the correction data storing unit 22R-3D. In this manner, the correction data optimally used when an image of 3D content is to be displayed can be stored in the correction data storing units 22L-3D and 22R-3D.

The above-described processing may be carried out during a manufacturing process or in course of customer services, so that the correction data enabling optimal correction of the non-uniformity in display characteristics can be stored in the correction data storing units 22L-2D, 22L-3D, 22R-2D, and 22R-3D.

In the above embodiment, the image of 3D content is displayed using the wavelength division system. The present invention, however, is not limited to the cases where an image of 2D content is to be displayed and an image of 3D content is to be displayed using the wavelength division system. For example, in the case where an image of 3D content is displayed using another system such as a polarization display system in which polarizing filters are used as the optical filters, non-uniformity in display characteristics may occur due to the differences in properties of the optical filters. In such a case, the present invention may be applied to correct the non-uniformity in display characteristics, as in the case of using the wavelength division system.

The present application contains subject matter related to that disclosed in Japanese Priority Patent Application JP 2008-294232 filed in the Japan Patent Office on Nov. 18, 2008, the entire content of which is hereby incorporated by reference.

It should be apparent that the above embodiments are used only for disclosing the present invention by way of example, and that those skilled in the art may achieve modifications or alterations of the embodiments within the scope of the present invention. The scope of the present invention should be determined in consideration of the appended claims.

What is claimed is:

1. An image display apparatus comprising:
    an image forming unit configured to form an image for a left eye and an image for a right eye;
    a projecting unit configured to emit light for the left-eye image via an optical filter for the left eye and emit light for the right-eye image via an optical filter for the right eye to display the images so as to be superimposed on each other, the left-eye optical filter and the right-eye, optical filter having properties different from each other;
    a first correcting unit configured to correct image signals for the left eye using first correction data for use in correcting non-uniformity in the image being displayed by the light emitted via the left-eye optical filter;
    a second correcting unit configured to correct image signals for the right eye using second correction data for use in correcting non-uniformity in the image being displayed by the light emitted via the right-eye optical filter;
    a correction data selecting unit configured to select the first correction data and the second correction data, or third correction data and fourth correction data, the third correction data being for use in correcting non-uniformity in the image being displayed by the light emitted without being passed through the left-eye optical filter, the fourth correction data being for use in correcting non-uniformity in the image being displayed by the light emitted without being passed through the right-eve optical filter; and
    a driving unit configured to drive the image forming unit on the basis of the corrected left-eye image signals and the corrected right-eye image signals to cause the image forming unit to form the left-eye image and the right-eye image.

2. The image display apparatus according to claim 1,
    wherein the correction data selecting unit selects the first and second correction data when a stereoscopic image is to be displayed, and selects the third and fourth correction data when a plane image is to be displayed, the first correcting unit uses the first correction data to perform correction of the left-eye image signals when the first correction data is selected by the correction data selecting unit, and uses the third correction data to perform correction of image signals for a plane image when the third correction data is selected by the correction data selecting unit, the second correcting unit uses the second correction data to perform correction of the right-eye image signals when the second correction data is selected by the correction data selecting unit, and uses the fourth correction data to perform correction of image signals for a plane image when the fourth correction data is selected by the correction data selecting unit, the driving unit drives the image forming unit on the basis of the image signals corrected by the first correcting unit and the image signals corrected by the second correcting unit to cause the image forming unit to form the left-eye and right-eye images or the plane image, and the projecting unit emits the light for the left-eye image via the left-eye optical filter, emits the light for the right-eye image via the right-eye optical filter, and emits the light for the plane image not via the left-eye optical filter or the right-eye optical filter.

3. The image display apparatus according to claim 1, wherein the non-uniformity in the image being displayed includes non-uniformity in color or non-uniformity in luminance.

4. The image display apparatus according to claim 1, wherein the optical filters used in the projecting unit are wavelength division filters, the left-eye optical filter and the right-eye optical filter allowing lights of different wavelengths to pass therethrough.

5. An image display method comprising the steps of:

forming an image for a left eye and an image for a right eye by using an image forming unit;

emitting light for the left-eye image via an optical filter for the left eye and emitting light for the right-eye image via an optical filter for the right eye by using a projecting unit in order to display the images so as to be superimposed on each other, the left-eye optical filter and the right-eye optical filter having properties different from each other;

correcting image signals for the left eye by using a first correcting unit using first correction data for use in correcting non-uniformity in the image being displayed by the light emitted via the left-eye optical filter;

correcting image signals for the right eye by using a second correcting unit using second correction data for use in correcting non-uniformity in the image being displayed by the light emitted via the right-eye optical filter;

selecting the first correction data and the second correction data, or third correction data and fourth correction data, the third correction data being for use in correcting non-uniformity in the image being displayed by the light emitted without being passed through the left-eye optical filter, the fourth correction data being for use in correcting non-uniformity in the image being displayed by the light emitted without being passed through the right-eye optical filter; and driving, by using a driving unit, the image forming unit on the basis of the corrected left-eye image signals and the corrected right-eye image signals to cause the image forming unit to form the left-eye image and the right-eye image.

* * * * *